US008823333B2

(12) United States Patent
Kawamura (10) Patent No.: US 8,823,333 B2
(45) Date of Patent: Sep. 2, 2014

(54) CONTROLLER AND SYSTEMS OF PERMANENT MAGNET ALTERNATOR AND MOTOR

(75) Inventor: Hideo Kawamura, Kanagawa (JP)

(73) Assignees: Hideo Kawamura, Kanagawa (JP);
Masayo Kawamura, Kanagawa (JP)

( * ) Notice: Subject to any disclaimer, the term of this patent is extended or adjusted under 35 U.S.C. 154(b) by 59 days.

(21) Appl. No.: 13/809,533

(22) PCT Filed: Jul. 11, 2011

(86) PCT No.: PCT/JP2011/003956
§ 371 (c)(1),
(2), (4) Date: Jan. 10, 2013

(87) PCT Pub. No.: WO2012/008137
PCT Pub. Date: Jan. 19, 2012

(65) Prior Publication Data
US 2013/0113442 A1  May 9, 2013

(30) Foreign Application Priority Data

Jul. 12, 2010  (JP) ................................. 2010-158161

(51) Int. Cl.
*H02P 9/00* (2006.01)
*H02P 9/48* (2006.01)
*H02P 9/30* (2006.01)
*H02P 9/10* (2006.01)

(52) U.S. Cl.
CPC ............ *H02P 9/48* (2013.01); *H02P 2009/004* (2013.01); *Y02E 10/725* (2013.01); *H02P 9/305* (2013.01); *H02P 9/10* (2013.01)
USPC ............................................... 322/44; 322/46

(58) Field of Classification Search
USPC .................. 322/46, 24, 44, 28, 89; 307/10.1; 310/68 R, 68 D; 323/282
See application file for complete search history.

(56) References Cited

U.S. PATENT DOCUMENTS

| 6,034,511 | A  * | 3/2000 | Scott et al. ...................... 322/46 |
| 6,541,887 | B2 * | 4/2003 | Kawamura .................... 310/190 |
| 7,256,567 | B2 * | 8/2007 | Kawamura ....................... 322/46 |
| 7,554,303 | B1 * | 6/2009 | Kawamura ....................... 322/46 |

FOREIGN PATENT DOCUMENTS

| JP | 2-46150 A    | 2/1990 |
| JP | 2003-70299 A | 3/2003 |
| JP | 2003245000   | 8/2003 |
| JP | 2004320972   | 11/2004 |
| JP | 2006529076   | 12/2006 |
| JP | 2008-182813 A| 8/2008 |
| JP | 4227189      | 2/2009 |
| JP | 2009-303471 A| 12/2009 |

* cited by examiner

Primary Examiner — Tulsidas C Patel
Assistant Examiner — Viet Nguyen
(74) Attorney, Agent, or Firm — Notaro, Michalos & Zaccaria P.C.

(57) ABSTRACT

Solenoid coils not interlinked by magnet flux of a rotor, increase inductance of a control coil system for controlling generated voltage using little current flow to a switch so no increase in windings of a power coil is needed. A generator with rotor having magnets and stator outside the rotor, have winding coil of the stator connected in series to solenoid coil. A power terminal is between the power and control sides of the solenoid coil and a switch controls flow of current from the power coil to the solenoid coil. By controlling ON/OFF condition of the switch disposed on the DC terminal of a rectifier connected to the solenoid coil in series, the generated voltage is controlled to a voltage set in advance, in response to a detection signal from a sensor detecting the voltage.

12 Claims, 8 Drawing Sheets

CONTROLLER AND SYSTEMS OF PERMANENT MAGNET ALTERNATOR AND MOTOR

TECHNICAL FIELD

The present invention relates to a permanent magnet generator and motor with a controller to maintain constant voltage by controlling ON/OFF of a switch provided at the control side branched off from power line which is comprised of a rotor mounted with a plurality of permanent magnet members on an periphery side for rotation in a stator housing, a stator surrounding around an outside periphery of the rotor, stator power coils contained a power, solenoid coil of power side, solenoid coil of control side, a switch for controlling and controller to keep a voltage constantly furthermore three phase rectifiers are used for changing neutral pointes of power coils and controlling flow of current amount by switching ON/OFF.

BACKGROUND ART

So far, the improvement of efficiency in a generator has been big problems in the requirement of energy saving. In the structure of the generator, electrical magnet is used for a rotor mainly, which is produced magnetic force by flowing current amount in a coil installed in the rotor. They know well that the efficiency is improved on the generator by use of a permanent magnet rotor because it is no need to use a current for producing magnetic force. However it has been difficult to use the permanent magnet (PM) generator for such as automotive vehicle driven many electric equipments by constant voltage because the generated voltage is changed up and down as generator speed change. The reason is that the magnetic force must be reduced to smaller value to maintain constant voltage at higher speed however the magnetic force can't be changed.

However many researchers are making effort to develop the PM generator to get constant voltage even if the speed is changed. Then, AC electric power is changed to DC current for a while, the DC current is switched by high frequency and the width of switching pulse is controlled to meet a voltage set in advance which is so called DC-DC converter or a phase controlled converter. The system is very expensive, large size, and low efficiency because of using large size of transistor for letting flow all of large current amount generated by the generator.

Namely, as the structure is very simple and generated power is very big in spite of small size due to very strong magnetic force, then PM generators are used for automotive and wind turbine and those have been increasing recently. In the PM generator, the motor can respond to the change of voltage even if the motor use the electric power generated in PM generator, however it is need to control voltage constantly in the case of using electric power for many electric equipments and connecting a storage battery. Many researchers have carried out to research how to control the voltage constantly in PM generator, and the method of controlling the voltage constantly used switching regulator was developed by GM however the system had big problems such as large size of controller, expensive and low efficiency.

An inverter for driving motor is used for a hybrid and an electric vehicle, the inverter system is used for the phase controlled converter in the popular systems in order to control the voltage constantly. A controller of the phase controlled converter control the voltage by cutting a waveform of electric power, then the overlap interval between the waveform of current and voltage is changed, as the result a power factor of load is reduced that is the problem of the system. In order to make the voltage constantly, the electric voltage should be chopped in the switching regulator which is used big size of power transistors, as the result the system was increased in the size, cooling system and cost. It is easy to break down much more by larger current flow into the power transistor. Because the flow of larger current amount make the temperature of the transistor raise, high voltage make an insulation between emitter and collector of a transistor break down, therefore, the smaller flowing current amount into the transistor is, the better and the cheaper, the system become.

For example, the voltage has to be reduced at high revolution speed, and has to be increased at low revolution speed in the generator with permanent magnet rotor used for a hybrid vehicle and an electric vehicle. When the converter is controlled the voltage, it is need to use a back chopper circuit or a boost chopper circuit and the controller become very complicate and expensive. On the other hand, the spike of current sometimes produced when the electric power was chopped and the spike pull the trigger of obstacle in a radio wave then the countermeasure of noise become very difficult problems.

The methods of reducing the magnetic force of permanent magnet when the rotor speed increased were studied by many researchers. For example, the controllers used reactive power were developed, which was needed big size of a converter and a reactor, on the other hand, generators wound coils in opposite directions in addition to power coil in parallel were developed, which was no need mechanical control systems and the structure was simple because of small number of parts, having reliability and the excellent control-ability of voltage in power coil, they said. Prior PM generator is composed of stator with winding coils, rotor mounted permanent magnet pieces and control coil supplied current from inverter and the current flowing into the control coil produce magnetic force in optically direction in order to reduce magnetic force to flow into stator and the voltage, which is disclosed in Japanese Patent Application Laid-Open Publication No. 2004-320972.

Furthermore, the generator realized high efficiency was proposed. Prior generator is consisted of stator with winding coil and rotor having permanent magnet pieces and iron cores then controller makes the magnetic force reduce by using reluctance power which is produced the magnetic force on non-symmetrical position disclosed in Japanese Patent Application Laid-Open Publication No. 2003-245000.

Other patent was opened that is consisted of rotor mounted permanent magnet pieces, stator with coils, and secondary magnetic coils set up in a right angle against the circuit of PM flux to control voltage or current of the power disclosed in Japanese Patent Application Laid-Open Publication No. 2006-529076.

Furthermore, a winding coil of stator is formed of a power coil wound by smaller in the number of winding, a control coil with larger in the number of winding and a solenoid coil are connected in series and a switch is provided between the power coil and control coil and a controller is increased a current flowing in control coil when the voltage of power coil is higher than a voltage set in advance, and the controller reduce the current when the voltage is lower than the voltage set in advance which is disclosed in Japanese Patent Registration No. 4227189.

However it is very difficult to weaken magnetic force of permanent magnet in response to increasing rotor revolution speed to the higher by using the methods mentioned above and those technologies have not realized in practical use.

On the other hand, DC-DC converter is used for hybrid vehicles, in the system, DC electric power rectified AC current from the generator is chopped by controller and it is transferred to DC power having a constant voltage set in advance furthermore the DC power is changed to AC power by using a inverter. However those were disturbed by complicated structure and large size of the system to be diffused them in the automotive market.

Particularly, the power factor of load is reduced when the voltage is reduced by phase control systems which are used in hybrid vehicles and an efficiency of recovering brake energy is reduced. On the other hand, energy problems become worse recently, and the consumption of electric energy in conventional vehicles increase rapidly and about 50% efficiency in the Lundell type generator has not permitted yet in conventional vehicles. As the result, a generator having simple structure and simple and certain controller is required strongly in the social situation.

The generator with stator wound two kind of coils and one side of coil was used for controlling magnetic force by flowing the current to produce magnetic force in opposed direction were developed by many researchers. In order to reduce the magnetic flux of PM force which flows into stator, the magnetic flux produced by current flowing from an inverter need to be similar shapes to PM flux, however those techniques were very difficult. Furthermore, those electric magnetic flux opposed to PM flux makes the magnetic force of PM material reduce and they suffered with the trouble of generator.

CITATION LIST

Patent Literature

PTL 1: Patent 2004-320972
PTL 2: Patent 2003-245000
PTL 3: Patent 2006-529076
PTL 4: Patent 4227189

SUMMARY OF INVENTION

Technical Problem

The inventor of this invention produced the generator system which was explained in Japanese Patent Registration No. 4227189 and we experimented in it many times in a research center in Kanagawa prefecture in Japan. As the result, the inventor confirmed that the voltage of generator was controlled the voltage set in advance by used small control current which was no used any magnetic force controller and the reduction of magnetic force was not found in the permanent magnet system.

Especially, the system had good effect in the controlling of voltage in low voltage condition for example 14V or 24V. However, when the voltage at high speed revolution of generator increase too much in the generator of 200 V-AC, a transistor having high voltage resistant was required (PET).

Namely, winding coil wound in stator is composed the power coil with small winding number and control coil having large winding number and control switches are provided between the both coils, furthermore, a controller control the voltage generated in the power coil constantly which is respond by the detecting signal of the voltage sensor installed output terminals and the switch letting flow a part of current generated in the power coil to the control coil. In the case of increased winding number of control coil in order to reduce the control current, the voltage produced in the control coil increase. On the other hand, it must be increased the winding number of the coil to increase the coil inductance to reduce the amount of current for controlling, which phenomenon is inconsistent with. Then, it is very difficult to avoid that the generated voltage increase very higher at high speed revolution of the generator in the PM generator.

For example, the voltage in electromotive force increase 220 V(AC) at 2000 rpm, 440 V at 4000 rpm and 660 V at 6000 rpm in 200V PM generator. As the voltage value of power coil is effective value, the peak voltage is 1.4 times of the effective voltage. Moreover, when the winding number of control coil is set up four times of the winding number of power coil, the voltage of control coil increase 2640V at 6000 rpm and it is very difficult usage for popular transistor which is IGBT and FET. As the result, the expensive transistor should be used for the controller provided such higher voltage transistor, the cost of controller also increase very much which is very big problem. (The cost of transistor resisted to higher voltage of 2600V is 100 times of popular transistor.)

Furthermore as it is need to dispose the expensive transistors on each phases of the three phase generator, the cost of controller increase very much which is big problem.

The purpose of the present invention is that the power coil, the solenoid coil of the power coil side, the solenoid coil of control side and the switch constituted by thee phase rectifier and transistor switch are connected in series in order to simplify the system, while, the inductance of power coil line is increased without increasing the number of winding in power coil to reduce controlling current amount and the controller could be controlled the voltage set in advance at lower and higher speed of revolution in the generator. As the switching transistor is connected in DC terminal of the rectifier and the small size transistor switch for letting flow a part of current amount generated in a power coil to the solenoid coil of the control side by controlling ON/OFF of the switch so that a generated voltage is controlled to a voltage set in advance in response to a detection signal from a sensor for detecting the generated voltage by the power coil is provided. On the other hand, a peak voltage was controlled low voltage by adopting the method of changing winding number of power coils. As the result, I can use very cheap transistor for the controller and reduce the number of transistor and then the cost of controller system is reduced very much.

Solution to Problem

In order to achieve the project, a controller of a permanent magnet generator in accordance with the present invention comprises: a rotor shaft rotatably supported by a housing; a rotor fixed to the rotor shaft, and mounted with a plurality of permanent magnet members on an outer periphery side; and a stator disposed at the outside of the rotor and wound with a winding coil in three phase AC generator by star connection; wherein the winding coil of the stator for power coil and a solenoid coil of the power coil side and a solenoid coil of control side which are disposed at a position not interlinked with a magnet flux of a rotor, are connected in series and a power terminal is provided at least between the solenoid coil of power coil side and the solenoid coil of control side, and then the end of the solenoid coil of control side connected with a three phase rectifier constituted for neutral point and a switch connected with the DC terminal of the rectifier for letting flow a part of a current amount generated in the power coil to the solenoid coil of the control side for controlling current amount flowing into the solenoid coil of the control side by controlling ON/OFF of the switch by duty controlling so that a generated voltage is controlled to a voltage set in advance in response to a detection signal from a sensor for detecting the generated voltage by the power coil.

Here, in the controller of a permanent magnet generator in accordance with the present invention, it is preferable that the three phase rectifier is full bridge power converter constituted by diodes and plurality terminals of the solenoid coils of control side are connected with the each wire of U, V, W phase between two diodes in the rectifier.

Moreover, in the controller of a permanent magnet generator in accordance with the present invention it is preferable that the controller regulates a current amount flowing into the solenoid coil of control side by duty-controlling for controlling the current amount flowing into the solenoid coil of control side by controlling ON/OFF of the switch so that a generated voltage is controlled to a voltage set in advance in response to a detection signal from a sensor for detecting the generated voltage by the power coil, furthermore when the generated voltage sensed by the sensor of detecting the generated voltage is higher than the voltage set in advance, the current amount is increased by the controller and when the generated voltage is lower than the voltage set in advance, the current amount is reduced by the controller.

And, in the controller of a permanent magnet generator in accordance with the present invention it is preferable that the plurality of terminals for neutral point of three phase generator are provided on the beginning and halfway of the power coils so that the neutral point can be changed and plurality neutral switches are provided to control ON/OFF of the neutral switches for the generated current amount flowing into the neutral point, moreover, the controller control ON/OFF of the neutral switch in response to detection signal from the sensor for detecting a rotor speed set in advance.

Moreover, in the controller of a permanent magnet generator in accordance with the present invention it is preferable that the three phase rectifier is provided for the neutral switches to change neutral point, and terminals disposed on the beginning and halfway of power coils are connected with the wires between diodes of U, V, W each phase in the rectifier for neutral point and the neutral switch connected with DC terminal of the rectifier for switching ON/OFF of neutral switch and then the controller control ON/OFF of the neutral switch in response to detection signal from the sensor for detecting a rotor speed set in advance.

Moreover, in the controller of a permanent magnet generator in accordance with the present invention it is preferable that the three phase rectifier is full bridge power converter constituted by diodes and terminals disposed on the beginning and halfway of power coils are connected with the wires between diodes of U, V, W each phase in the rectifier for the neutral point.

Moreover, in the controller of a permanent magnet generator in accordance with the present invention it is preferable that the winding number of power coils are constituted by plurality of winding number T1, T2, - - - ,Tn and the winding number of power coils have the relation of following inequality T1<T1+T2<T1+T2+ - - - +Tn and the terminals of neutral point are disposed on the beginning and halfway of the power coils, and then the terminals connected with the wires between diodes of U, V, W each phase in the full bridge power converter and the neutral switches which are No.1, No.2, - - - ,No.n are connected with DC terminals of the rectifiers and the controller control ON/OFF of the neutral switches in order to change the neutral point in response to detection signal from the sensor for detecting a rotor speed set in advance.

Moreover, in the controller of a permanent magnet generator in accordance with the present invention, it is preferable that the controller performs a control in response to a detection signal from a sensor for detecting the rotor speed such that, when a rotational speed of the rotor is higher than the speed set in advance, the neutral switch of the power coil by the side of the small number of windings coil is turned ON, and at the same time the neutral switch of the power coil by the side of the large number of windings coil is turned OFF, in order to prevent the higher generated voltage at higher rotor speed.

Moreover, in the controller of a permanent magnet generator in accordance with the present invention it is preferable that wherein plurality power supply terminals connected with the power lines between the solenoid coil of power coil side and the power coil are connected with and plurality power supply switches for the electric motor drive connected with the plurality power supply terminals and another end of the power supply switches are connected with the storage battery of power side trough the controller, furthermore, the controller supply a current amount to the power coils from the storage battery so that the generator is driven for an electric motor by the current amount synchronized phase timing and controlled ON/OFF of the power supply switches.

Moreover, in the controller of a permanent magnet generator in accordance with the present invention it is preferable that the controller performs a control the current amount in response to a detection signal from a sensor for detecting the order of load in the electric motor by controlling ON/OFF of the neutral switch, namely the controller regulates a current amount flowing into the power coil from the storage battery in response to required driving force power in the motor.

Moreover, in the controller of a permanent magnet generator in accordance with the present invention it is preferable that the controller performs a control in response to a detection signal from a sensor for detecting the rotor speed such that, when a rotational speed of the rotor is higher than the speed set in advance, the neutral switch of the power coil by the side of the small number of windings coil is turned ON, and at the same time the neutral switches of the power coil by the side of the large number of windings coil is turned OFF in order to prevent the higher generated voltage at higher rotor speed, and when a rotational speed of the rotor is smaller than the speed set in advance, the neutral switch of the power coil by the side of the large number of windings coil is turned ON, and at the same time the neutral switches of the power coil by the side of the small number of windings coil is turned OFF, and then the controller performs to control current amount flowing into the power coils from the storage battery by controlling ON/OFF of the neutral switch in response to required driving house power, namely the controller make the neutral switch has both functions which are changing neutral point and regulating a current amount.

Moreover, in the controller of a permanent magnet generator in accordance with the present invention it is preferable that the controller performs control of all of the neutral switches to turn OFF, when the controller detect an abnormal phenomenon in the power coil or an abnormal high speed on the rotor revolution speed in response to a detection signal from the sensors of a current leakage of the power coils and the rotor revolution speed.

Advantageous Effects of Invention

The controller of the permanent magnet generator which composed with the power coil wound in the stator of generator, the solenoid coil of power side with larger winding number and the solenoid coil of control side having small winding number whose solenoid coils are disposed at a position not interlinked with a magnet flux of a rotor are connected in series. And the power coil and the solenoid coil of power side are provided for power side coils and the solenoid coil of control side is provided for control side, furthermore, those coils are connected with in series in order to reduce the current flowing into the control coil which used the character of reducing voltage (downward character) largely by a mutual inductance effect of the control coils. As the result, the winding number of power coil is not increased and the total amount of inductance in the coils increase to reduce control current amount and maintain constant voltage in the power coil.

Figure 2:
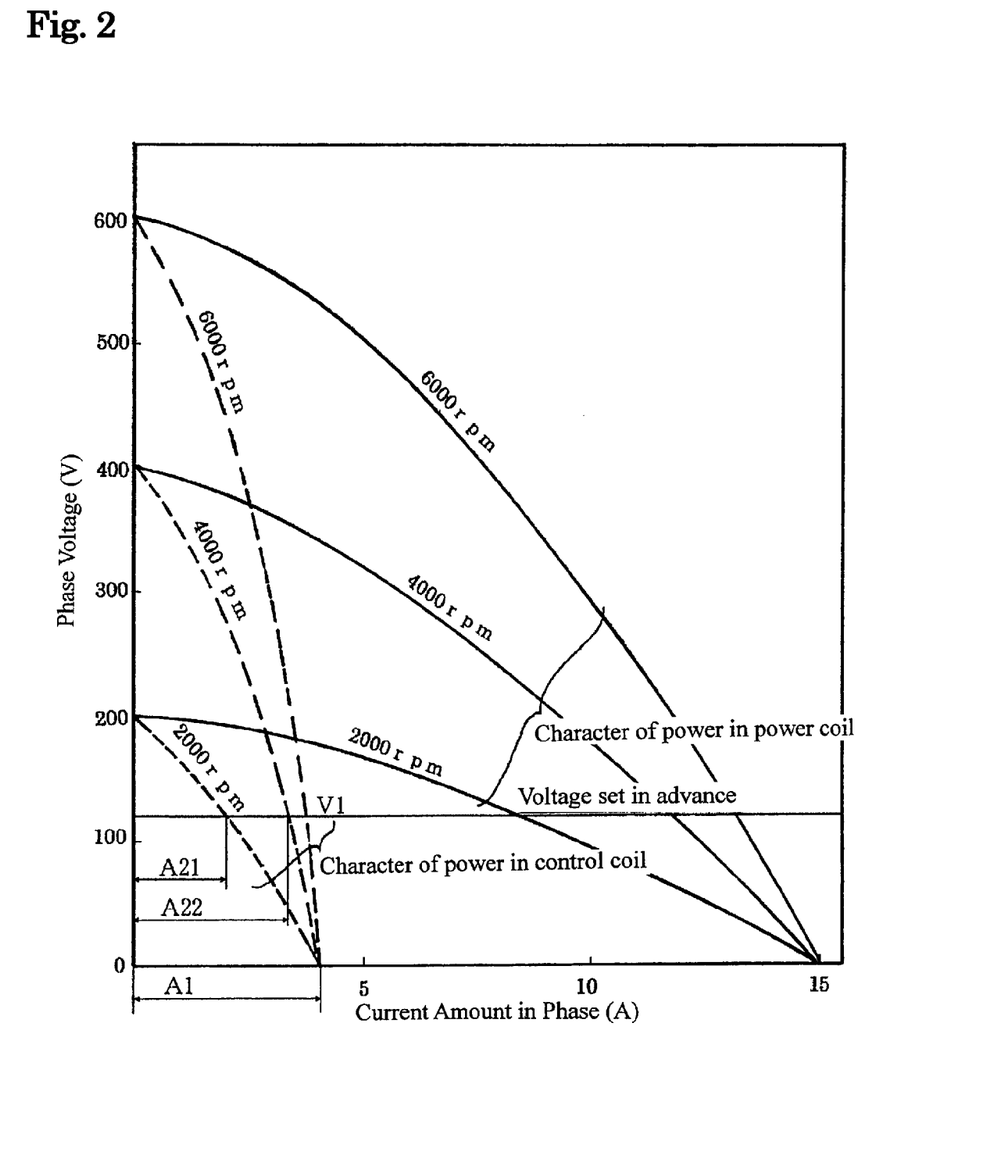
FIG. 2 is the character of voltage and current in the generator of power coil and power coil added solenoid coil is shown in the graph.

Generally in a generator, the higher the speed revolution of generator increase, the larger the electromotive voltage of the generator increase at no load condition, however the larger the current amount increase, the smaller the voltage become and the current converge one of the current at 0 volt, whose phenomenon is called the downward character in a generator. In case of letting flow current amount to the power coil connected with both solenoid coils, the converged current is reduced to very small value, however the converged current amount is not so small when the controller let flowing current amount into the power coil with the only solenoid coil of power side which character is shown in FIG. 2. When the voltage of power coil is higher at higher speed and the controller let flowing a small current into the control coil, the voltage of the terminal of power coil reduce to small value which used the phenomenon of the opposite electromotive force, namely the controller control the current amount flowing into the solenoid coil of the control side by controlling ON/OFF of the switch so that a generated voltage is controlled to a voltage set in advance in response to detection signal from a sensor. This system can control up and down of the voltage and keep the stable voltage set in advance.

Figure 3:
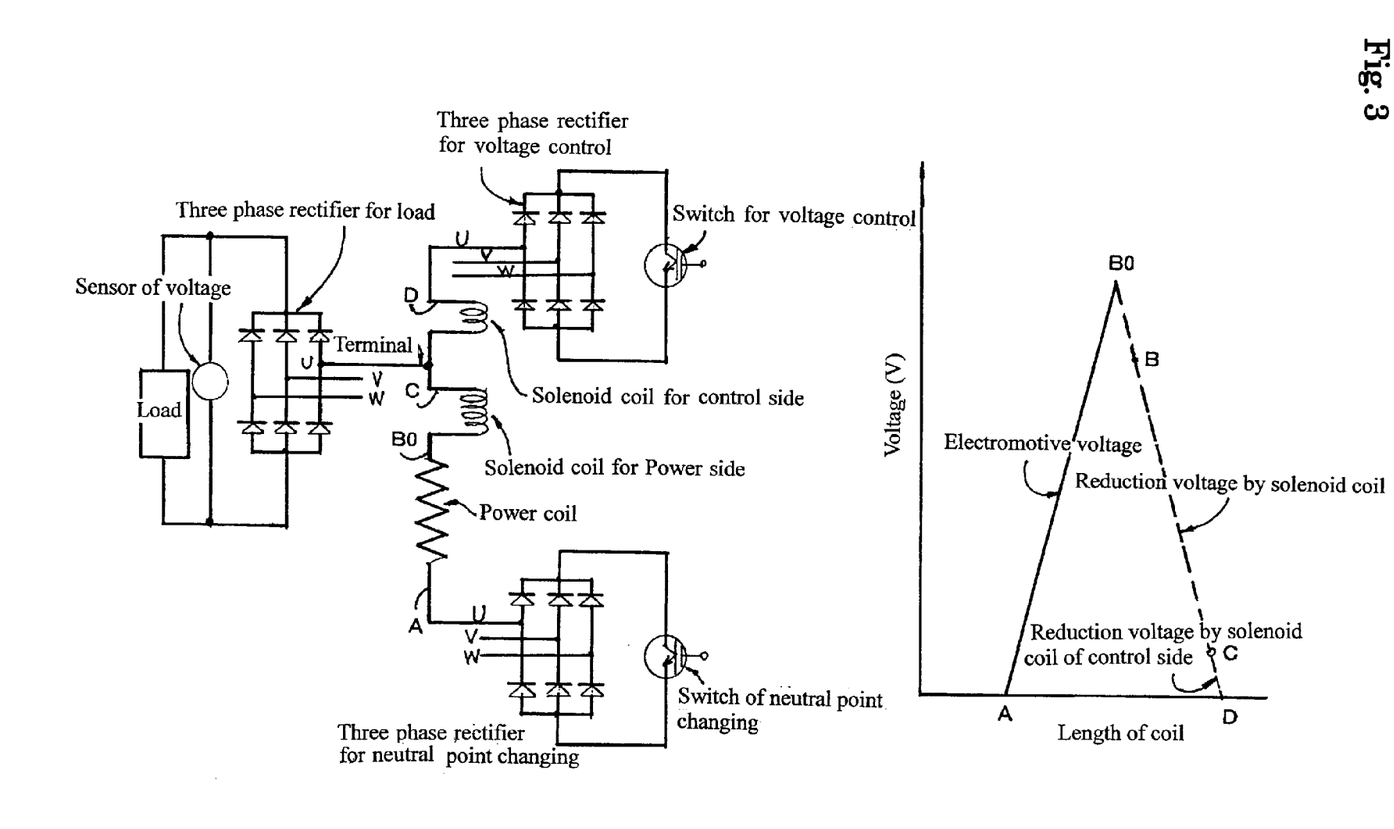
FIG. 3 is a voltage at coil positions and a wiring diagram explaining an example of circuit connection in the generator and controller in an aspect of the present invention shown in this drawing.

The principle of above theory is shown in FIG. 3. The electromotive voltage of the power coil is increased by the effect of permanent magnetic force, whose voltage of electromotive force increase from A point to B0 point. When a current amount flow into the power coil, the solenoid coil of the power coil side and the solenoid coil of control side through the rectifier, the voltage at the power terminal point is reduced to point C by the impedance of the power coil and the solenoid coil of power side and then the voltage is reduced to point D by the impedance of the solenoid coil of control side. Therefore, when the power coil side and the solenoid coil of the control side are connected with each other, we can get the necessary voltage between B0 and 0 by controlling ON/OFF of the switch by duty controlling in small current amount. The mutual inductance of the solenoid coil of the power side and control side affect to reduce the current amount for controlling effectively.

In other ward, when it is set up that N1 is winding number of the solenoid coil of power coil and N2 is winding number of the solenoid coil of control side, the inductance of the solenoid coil of power coil side is $L_1 = m*A*N1^2*/1$ and the inductance of the solenoid coil of control side is $L_2 = m*A*N2^2/1$, and then in case of connecting with both solenoid coils in series, the inductance of connected both coils is $L_3 = m*A*(N1+N2)^2/1$ and the value of $L_3$ is 2 times of the value of $L_1$ and over. Therefore, if the voltage is loaded to the solenoid coils connected with in series, the expression of the relation between the voltage and the current amount is shown in next equation.

$$E = I \cdot 2\pi \cdot f \cdot L_3 / 1000 \quad \text{[Math.1]}$$

As the result, the current amount of flowing into both coils is reduced ½ to ⅕, compared with the current amount which is loaded the same voltage to the solenoid coil of power side only. Marks used in equations are that l is magnetic length of solenoid coil core. A is the area of the solenoid coil core and "m" is permeability of the solenoid coil core.

The voltage increase to be in proportion to increasing winding number of power coil and the voltage reduce by the value multiplied flowing current amount by impedance of the power coil and flowing current amount by impedance of solenoid coil of power coil side. Therefore, when the controller let flowing a current amount into the solenoid coil of control side, the voltage at the power coil terminal reduce and the voltage of the power coil terminal is controlled by controlling ON/OFF of the switch so that a generated voltage is controlled to a voltage set in advance, whose switch is provided on the DC terminal in the rectifier.

Furthermore, the controlling voltage in the invention, the three phase rectifier is disposed in the neutral point at the end of the solenoid coil of U, V, W phase in control side which corresponded point D shown FIG. 3, and the terminal of solenoid coils end connected with the wires between diodes in the rectifier and then transistor switch is provided on the DC terminal of the rectifier, as the result, we need only one switch for controlling the voltage. Moreover, as the switch is disposed at the neutral point, the voltage at the switch position is 0 when the current amount is flowing into the switch. When the controller switch off, the voltage at the terminal of solenoid coil end increase to B0 shown FIG. 3, however the voltages at the switch position is composed between Bo and C volt and it is rectified by the rectifier and the composed voltage become below the electromotive voltage. When the spark of voltage is produced after switching, the voltage is increased from 0 volt, and then the peak of voltage have to be controlled, however the spark of voltage can be absorbed by small snubber circuit.

Then, I will explain the theoretical equation on the electromotive voltage and the reduction voltage of circuit by the impedance of solenoid coils and power coil.

The equation for calculating voltage is shown as follows.
[Math.2]
(1) Voltage of electromotive force $$E_0 = 4.44 \cdot \Phi \cdot f \cdot Ws \quad (1)$$

[Math.3]
(2) Voltage at the terminal of power coil $$E = E0 - E1 - E2 = E_0 - I_1 \cdot (R_1^2 + (2\pi \cdot f \cdot L_{11}/1000)^2)^{1/2} - I_2 \cdot (R_2^2 + (2\pi \cdot f \cdot L_{31}/1000)^2)^{1/2} \quad (2)$$

[Math.4]
(3) Current amount of flowing into the solenoid coil of control side $$I_2 = \{E_0 - I_1 \cdot (R_1^2 + (2\pi \cdot f \cdot L_{11}/1000)^2)^{1/2}\} / (R_2^2 + (2\pi \cdot f \cdot L_{31}/1000)^2)^{1/2}$$

[Math.5]
Marks used in equations are shown as follows.
$E_0$: voltage of electromotive force
E: terminal voltage of power coil
E1: reduction voltage when current $I_1$ is flow into power coil
E2: reduction voltage when current $I_2$ is flow into power coil, the solenoid coil of power coil side and control side
$\Phi$: magnetic force
f: frequency of generating voltage
Ws: winding number of power coil
$I_1$: current of power coil
$I_2$: current of flowing solenoid coil and power coil
$R_1$: resistance of sum of power coil and the solenoid coil of power side
$R_2$: resistance of sum of power coil and both solenoid coils
$L_{11}$: inductance of sum of power coil and power side solenoid coil $L_{31}$: inductance of sum of power coil and mutual inductance so of solenoid coils Here, the lager winding number of power coil increase, the smaller the current amount converge at 0 volt, however, the larger winding number of power coil increase, the larger the electromotive voltage increase. It is preferable that the current amount of converging to 0 volt is small and it is maintained the low voltage in the electromotive force. According to calculation (1) and (2), in the case of increasing the inductance $L_1$, $L_2$, $L_3$ and $L_{11}$ larger, the current amount of controlling can be reduced smaller. Therefore, it is very effective to add the solenoid coils provided in the outer side of stator which is disposed at the position not interlinked with a magnet flux of the rotor. However, when the inductance of $L_{11}$ increased too larger in order to be reduced flow the current amount into the control switch, the power voltage is reduced much more. Then, the effect of mutual inductance composed by both solenoid coils is very useful.

The voltage at the power terminal and the end of solenoid coil are calculated that the voltage of power terminal is deducted the product of the current amount and the inductance of $L_{11}$ from the voltage of electromotive force and the voltage of natural point in control side is reduced to 0 volt. As the larger winding number of power coil increase, the larger voltage of electromotive force increase, the solenoid coils with large inductance which is disposed at a position not interlinked with magnetic flux of a rotor, is required to reduce the voltage at the power terminal.

Figure 4:
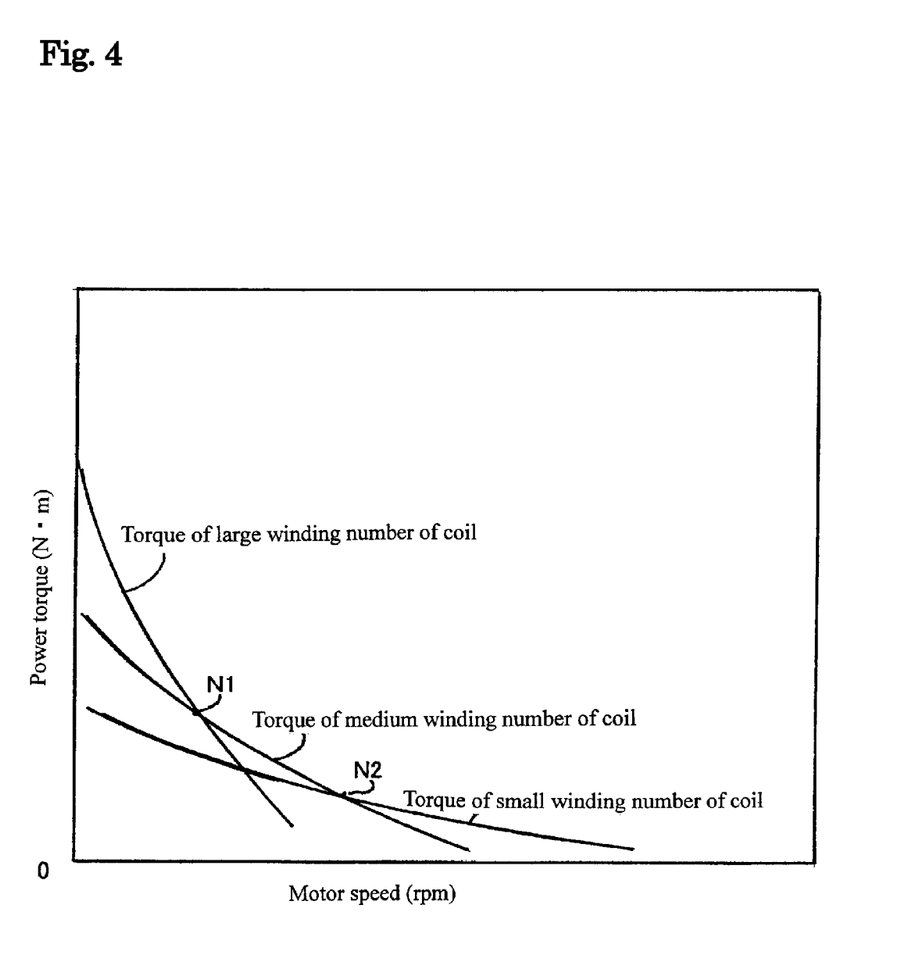
FIG. 4 is the torque curve when changing of winding number of the power coil and the control of the current amount for controlling load condition of the motor are carried out.

In the case of using the generator for an automotive motor, we need the character of motor that large torque is required at low speed condition and the a little torque is maintained at high speed condition. In order to get the character mentioned above in the motor, a neutral switch which can be changed winding number of the power coil and controlled ON/OFF the switch in response to detection signal from the sensor for detecting a rotor speed set in advance is provided. Furthermore it is need to control the load condition for required the motor driving and then the neutral switch used for changing winding number of power coil is used for high frequency ON/OFF switching to control flowing the current amount. As the result controller can control the motor in the condition required driving load and speed. The driving character of torque in the case of changing winding number of power coil and control character of load switched the current amount by ON/OFF switch the neutral switch are shown in FIG. 4.

Then, in the controller of permanent magnet generator according to the invention, the terminal end of solenoid coils of control side connected with solenoid coils of power side and power coil are connected with the three phase rectifier and a switch such as a power transistor is provided in DC terminal of the rectifier is controlled ON/OFF of the switch by duty controlling so that a generated voltage is controlled to a voltage set in advance as the result the controller become very simple and very cheapness, because the three phase rectifier is very cheap and obtained easily, which is very useful merit for an electric equipment. Furthermore, as it is no need to use the large size of transistor with high resistance for high voltage and the capacity of flow much current amount for the controller and many number of switching part are not required, as the result, it is possible to carry out much cost down in this system.

Furthermore, the natural switches constituted by three phase rectifier and a transistor are connected with terminals on the halfway and beginning of winding coil in power coils in order to be able to change flowing point of current amount and the controller performs a control in response to a detection signal from a sensor for detecting the rotor speed such that, when a rotational speed of the rotor is lower than the speed set in advance, the neutral switch of the power coil in the side of the larger number of windings coil is switched ON, and at the same time the neutral switches of the power coil in the side of the smaller number of windings coil is turned OFF, as the result, the controller make the electromotive voltage and the power at extremely low speed of the rotor increase.

Furthermore, in the case of using the generator for motor, the controller change the winding number of power coil by changing the position of the plurality neutral switches disposed in the halfway and beginning of power coils in response to detection signal from the sensor for detecting rotor speed set in advance, which system is effective to increase the driving torque by flowing current amount into the power coil with large winding number of coil from the storage battery because large magnetic force is produced in the large winding number of the coil. On the other hand, when the controller let flow the current amount into the power coil having small winding number from the storage battery, the only small magnetic force is produced and driving torque is reduced, however driving speed is increased higher. The system is same as the transmission.

In the generator system, the system can keep the voltage in lower condition and improve the durability and reliability of the power transistor and then the system is useful to raise the electromotive voltage at lower generator speed in order to increase the electric power at lower speed condition. As the result, we can get the generator which controlled the moderate voltage in the electromotive force even if the speed of generator increased too higher.

On the other hand, the control system of neutral switch has a beneficial function for the safety of the system which the controller performs control of all of the neutral switches to turn OFF, when the controller detect an abnormal phenomenon in the power coil or an abnormal high speed on the rotor revolution speed in response to a detection signal from the sensors of current leakage of the power coils and the revolution speed.

DESCRIPTION OF EMBODIMENTS

A generator controlled voltage by winding coil of power coil in accordance with the present invention will be hereinafter described with reference to the accompany drawings.

Figure 1:
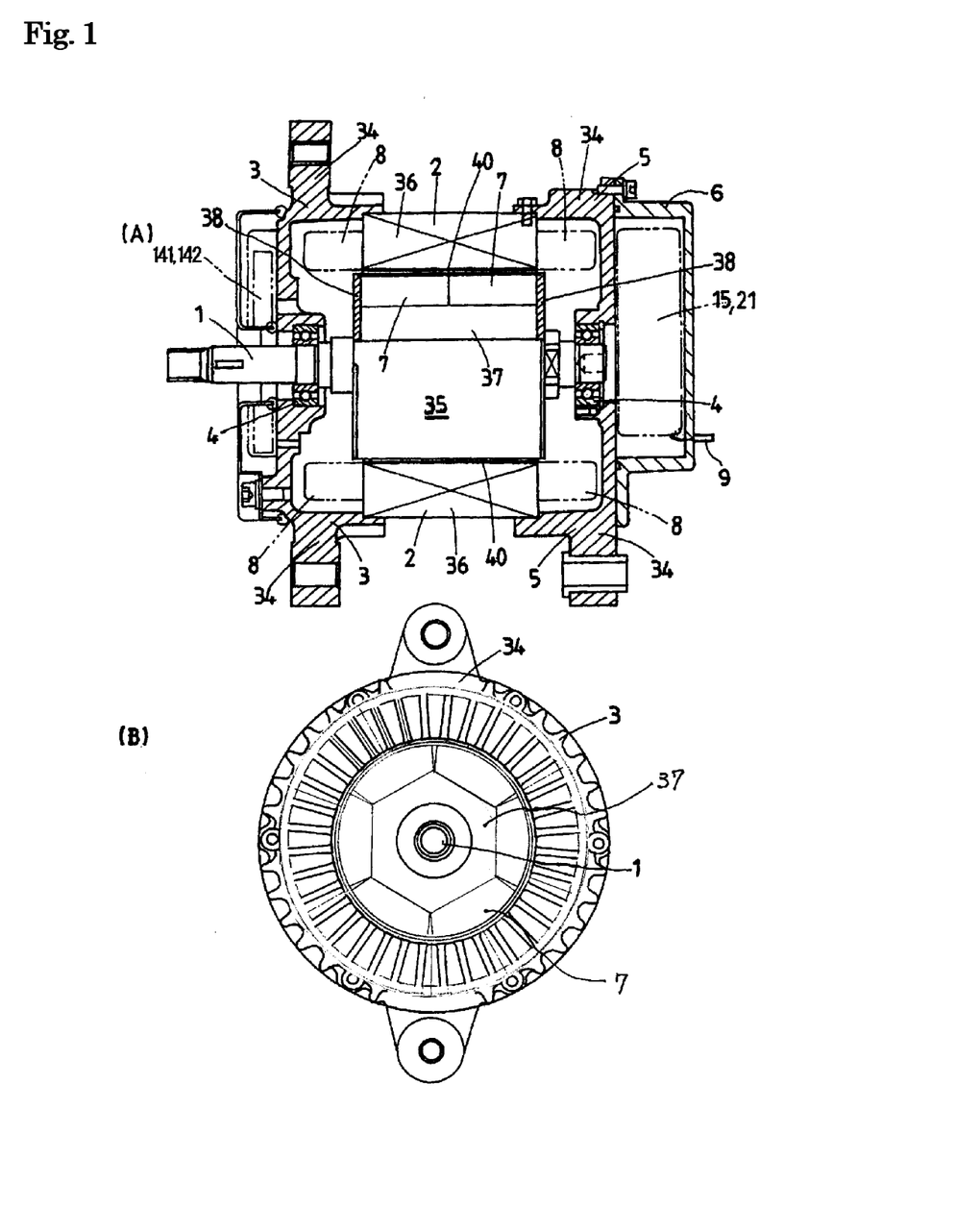
FIG. 1 is a front view (A) and a side view (B), and the structure of generator with the controller in accordance with the present invention is shown in this picture.

The permanent magnet generator controlled voltage by winding coils as shown in FIG. 1, is comprised of stator hosing 34 which is a pair of housing halved housing 3 and 5, a rotor shaft 1 supported for rotation in the housing 3 and 5 by means of a pair of axially opposite ball bearings 4, a rotor 35 of a multi-polar permanent magnet member 7 in which more than one pair of permanent magnet pieces is arranged circumferentially around the rotor shaft 1, a stator 2 arranged around the outer periphery of the rotor 35. The stator 2 is composed by stator core 36 and rolled up by electromagnetic coils 8 arranged in stator core 36. An equipment of driving such as pulley is fixed to the end of rotor shaft 1, which is not shown in FIG. 1. The rotor shaft 1 is composed of a magnetic permeable member 37 arranged on the rotor shaft 1 and the permanent magnet member 7 of more than one permanent magnet piece are mounted axially. Furthermore, around the outside periphery of the permanent magnet member 7 there is provided a first reinforcing member 40 to keep the permanent magnet member 7 against falling off the rotor 35 owing to a high centrifugal force, the reinforcing member 40 being made of high tensile fibers made of resin. The rotor 35 is clamped between axially opposite backing plate 38 and flange and fixed by nut such as tightening tools in integration. In the generator, rectifier 15, 397 and a solenoid coil are set up in outer side of the front housing 3. The solenoid coils are located at the outside of the stator, which is meant that the solenoid coil 141,142 is disposed at a position not interlinked with a magnetic flux of the rotor. Then disposed position is no limitation, for example, it is possible to dispose it in the housing or motor casing if the position is not interlinked with a magnetic flux of the rotor. Stator coils 8 are wound in the slot of the stator core 36 which are embedded between the teeth of combs and nonmagnetic materials such as resin is inserted in gap of the slot to be fixed the stator coils 8.

Figure 5:
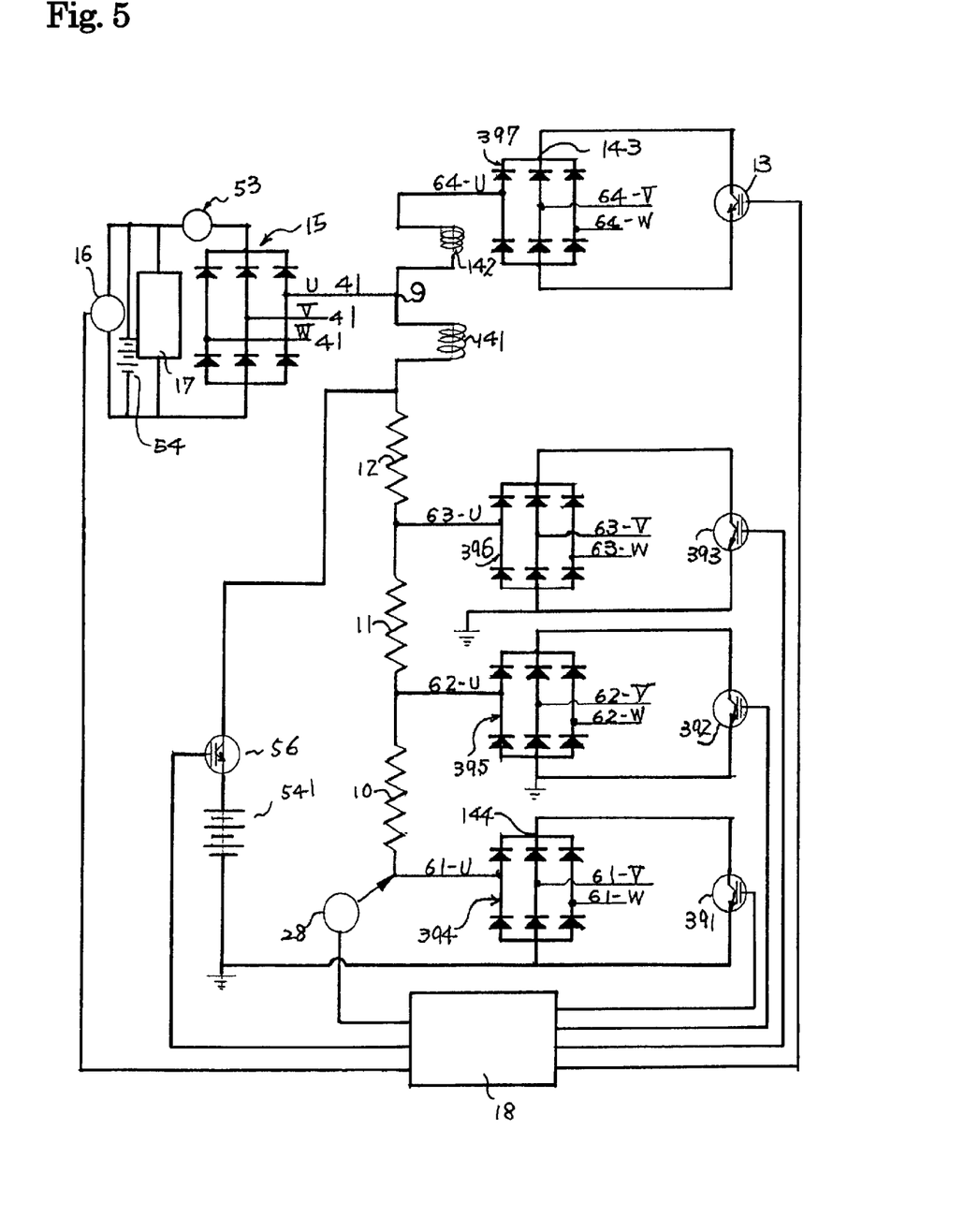
FIG. 5 is a one of example for the control circuit of the permanent magnet generator and the motor

In the specifications, it is included power coil 10 and power coil 11,12 in the power coil composed stator coil which is shown in FIG. 5 and then the three phase rectifier 394 are disposed at the neutral position of three phase alternator and the terminal of each phase 61-U,61-V and 61-W are connected with the wire between diodes in the rectifier 394 and the switch of transistor 391 is provided on the DC terminal of the rectifier 394 and the winding coil of the power coil side is composed by the power coil and the solenoid coil of power side 141. On the other hand, the winding coil of control side is composed by the solenoid coil 142.

The system of winding coil is composed by the winding coil of power side and the winding coil of control side, and it's so called in the invention. The mark 143 shown in FIG. 5 is the neutral point of solenoid coil 142 in control coil side and the mark 144 shown in FIG. 5 is neutral point of power coil and then the neutral point is changed the position from 391 to 392 or 393 sides when the switch of 392 or 393 turn on.

The one example of controller produced by the present invention enforced in the experiment will be hereinafter explained with reference to the accompanying drawing FIG. 5.

Stator coil 8 which is composed power coil 10,11 and 12, for example, are wound in the slot of stator core 36 and the power coil 10,11, power coil 12 and solenoid coil 141 are connected with the solenoid coil 142 in series which is one example of currying out the present invention and the coil line are connected with three-phase such as star-connection which is also connected with a neutral switch 394 as starting point. The power terminal 41 is connected with the end point 9 of the solenoid coil 141. The neutral switch constituted by three phase rectifier 394 is connected with the beginning of the power coils 61-U, 61-V and 61-W and the neutral switch 391 is connected with the DC terminal of the rectifier 394, and other neutral switches 392,393 which are disposed on rectifier 395 and 396 and then the rectifier are connected with plurality of the terminals 62-U,62-V and 62-W in the rectifier 395 and the terminals of 63-U,63-V and 63-W in the rectifier 396 which are taken out from the power coil lines between the power coil 10, 11 and the power coil 12. The power switch 53 is connected with the terminal of after rectifier which a wire 41 connects, rectifier 15, and load 17 in series. It is possible to connect a storage battery 54 in parallel with load 17. Three terminals which the wire U-41, V-41 and W-41 connects to each are connected with the rectifier 15 with three-phase and DC electric power produced in the rectifier 15 is sent to the load 17 for single-phase. A sensor of voltage 16 and storage battery 54 are located with the load 17 in parallel and the sensor for speed 28 and position of pole produced by permanent magnet members 7 is arranged on the near of the rotor 35. On the other hand. The signals sent from the sensor of voltage 16 and load 17 and the speed and position sensor 28 is inputted to the controller 18 then the controller 18 sends open and close signals to the control switches 13, the neutral switch 391,392 and 393 and power switches 53 and motor drive switch 56 to control the voltage constantly and motor drive. The winding number of power coil is changed by ON/OFF switching of the neutral switch 391,392 and 393 which are provided at the terminal between the power coil 10, 11 and 12. Furthermore, it is possible to dispose a storage battery connected with the load in parallel.

The solenoid coil 141 is connected with the end of power coil 12 and the end terminal of solenoid coil 141 connected with the power terminal 41 and the solenoid coil 42.

In order to maintain in the small level amplitude of the voltage on the control switches 13 which is disposed at the DC terminal of rectifier 397 and the end of solenoid coils 64-U, 64-V and 64-W are connected with the terminals between diodes in rectifier 397 for switching current amount, the solenoid coil 142 and 141 are connected with the power coil 10, 11 and 12 in series, because the solenoid coil 141 and 142 make the current of flowing into the solenoid coil 142 reduce dramatically due to large mutual inductance composited by the solenoid coil 141 and 142 even if the load 17 and the rotor 35 speed are changed quickly. Therefore, it is very important invention items to arrange the solenoid coil 141 and 142.

On the other hand, when the control switches are provided on the power lines, the voltage after the switches is swing very much, therefore, the control switches 13 are disposed at the DC terminal of rectifier 397. When the transistor receive the spike with high voltage, it is easy to bring the breakage of control switches in the systems disposed the control switch on the power line, and then the control switch 13 is provided after the three phase rectifier.

As the control switch is reduced from six to one in the system of the invention, the cost down is realized in the system because a rectifier cost is very cheap.

In order to makes the voltage of power line stabilize, it is very effective to provide capacitors between the terminal of the solenoid coil 141 and 142. Putting the capacitor makes the voltage of power terminals 41 and the DC power at the load condition increase and steady.

In the case of using the generator for the motor, the controller switch off the switch 53 and 13 and switch on the switch 56 of driving motor and the neutral switch 391 and then the controller catch up phase position on the rotor 1 by detecting sensor 28 and let flow the current amount into power coils in synchronized timing by the switch 56 from the storage battery 541.

The controller 18 select ON position of the neutral switch 391 for using power coil 10, 11 and 12 when the motor speed is lower and select ON position of the neutral switch 392 and 393 with increase of the motor speed, as the result, the controller can change the character of driving torque in the motor system like a transmission which is shown in FIG. 4.

However it need to change torque values and then the controller control ON/OFF (chopper control) of the switch so that a driving torque of the motor is controlled to a load set in requirement value for driving.

Figure 8:
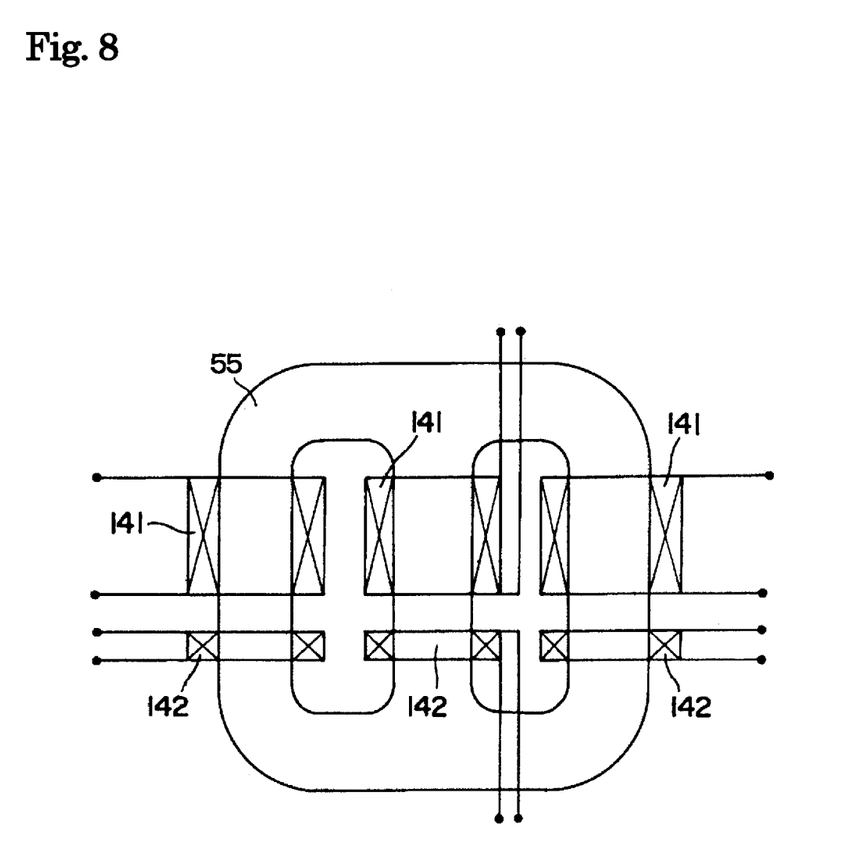
FIG. 8 is the structure of solenoid coils to be worked for the control circuit shown in FIG. 3.

The controller of the generator control a current flowing into the solenoid coil 142 by controlling ON/OFF of the switch 13 which can change opening times so that a generated voltage is controlled to a voltage set in advance. Here, in order to reduce a current amount of flowing into the solenoid coil 142, the effect of mutual inductance in the solenoid coil 141 and 142 is used, therefore, those solenoid coils is wound in same solenoid core 55 which is shown FIG. 8. As the result, when the coils 141 and 142 are connected with in series, the mutual inductance increase very much and electrical resistance increase very much in the case of flowing a current amount into the solenoid coils.

When a small current amount flow into the solenoid coils, the voltage at the terminal of power line 41 reduce very much and the mean voltage after ON/OFF switching of the switch 13 at the rectifier 397 is controlled the voltage set in advance. If a current amount is flowing into the control side, electronic power loss is very small because the consuming of electric power in reduction of voltage by the inductance of solenoid coil 141 and 142 is wattles power. The character of voltage and current shown FIG. 2 is shown that if the controller let flowing a current amount A1 into the solenoid coil 142 side, the voltage reduce to 0, then maximum current amount used for controlling is A1 ampere. In order to get the voltage set in advance, controller set the ON time of the switch 12 by duty control, which ampere is A21 at 2000 rpm and A22 at 4000 rpm.

In the controller of generator, the switch 13 for controlling voltage is provided in the end of coil line which is connected with the solenoid coil 141 and the solenoid coil 142, and the power coil 10, 11 and 12 in series, and then the position is very important factor. The future of the controller is that the generated voltage of power coil 10, 11 and 12 increase 600V or over at OFF condition of switch 13 and the voltage reduce to small or 0 volte by the inductance of the solenoid coil at ON condition of switch 13 and the mean voltage of ON and OFF condition become to be equal the voltage set in advance.

On the other hand, when the generator speed is increased very higher or reduced very lower, the character of generated voltage can be changed by switching of the winding number of power coils 10, 11 and 12 which is carried out by switching the neutral switch 391,392 and 393. As the result, we can get the suitable power and voltage from lower speed to higher speed by using the changing system of the winding number in power coil. The system is very effective for electric vehicle on brake energy recovering system.

The operation of the controller shown as FIG. 5 is explained as follows and the flow chart of the controller is shown FIG. 6 and FIG. 7.

When the generator speed is increased to about 6000 rpm or over, the voltage at the end of power coil 12 is raised to about 1000 volt. Then, the controller control change of the neutral point by changing from switch ON of the switch 391 to the switch ON of the switch 392 or the switch 393. In the case of the switch ON of the switch 393, the power coil 12 is used for generating, as the result, the electromotive voltage is maintained lower voltage and the current amount flowing to the solenoid coil 142 is reduced very small value because of large mutual inductance by connecting the solenoid coil 141 and 142 which are disposed at the position not interlinked with a magnet flux of rotor, furthermore the voltage at the end of the solenoid coil 141 and the point of the power terminal 9 is reduced below 100 Volt which voltage is reduced by the effect of the inductance of solenoid coil 141. Therefore, there is nothing to produce large surging or spark of voltage in this condition.

Generally speaking, the current amount with high voltage is switched ON/OFF, the switch is broken down by spark of the voltage.

However, as the switch 13 disposed at the DC terminal of the rectifier 397 which is provided at neutral point of the three phase generator, it is very difficult to happen the trouble of brake down in the switch 13 because the voltage at the DC terminal of rectifier is low. The controller control the current amount flowing into the switch 13 so that the ON time of switch is increased when the generating voltage is higher than the voltage set in advance, and ON time is decreased when the generating voltage is lower than the voltage set in advance which is detected by voltage sensor 16. Then, As the switch 13 is disposed at DC terminal of the rectifier 397 and the rectifier 397 is connected with the solenoid coil 142, the solenoid coil 141 and the power coil 12, the pulse wave produced by switch ON/OFF in the switch 13 is leveled off by the circuit.

When revolution speed of generator is reduced, the controller switch ON of the neutral switch 391 and switch OFF of the neutral switch 392 and 393 in order to use the winding coil of 10,11 and 12 which condition is returned to beginning. For example to talk about use of winding coils, the winding coils 11 and 12 are used for normal speed condition, and then the winding coils 10, 11 and 12 are used at extremely low speed as the speed of 450 rpm or 800 rpm, as the result the voltage is increased and we can get the sufficient power. The one control switch 13 is used for controlling the voltage set in advance even if the controller curry out controlling the neutral switches of ON or OFF. The changing system of the winding number in the power coils can be used for the motor driving which is carried out same function as a transmission. Furthermore, it is no limited to use only three neutral switches, and it is possible to increase or reduce the number of switches.

Figure 6:
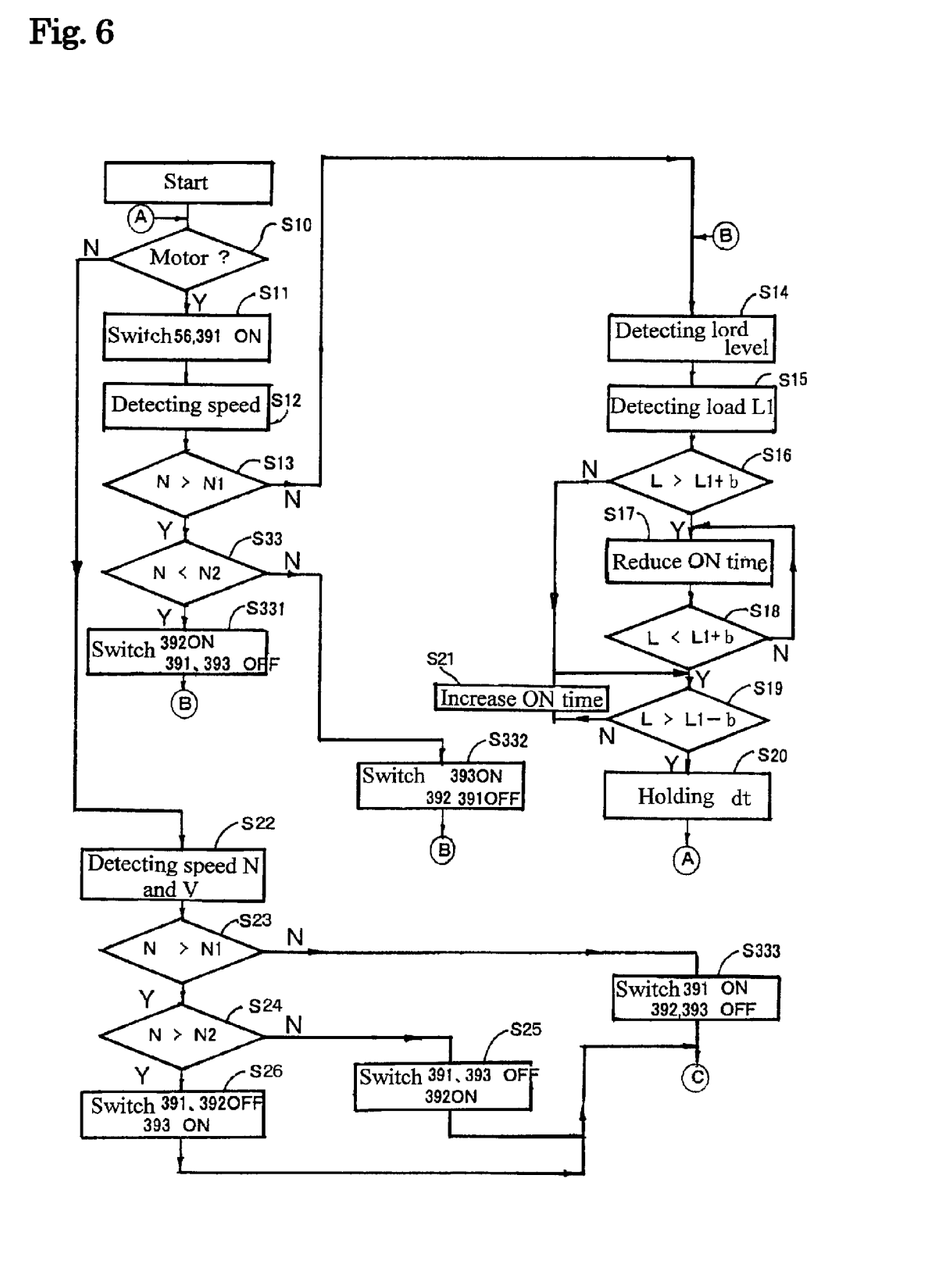
FIG. 6 is the flow chart of the controller shown in the drawing to be worked for the motor shown in FIG. 3.
Figure 7:
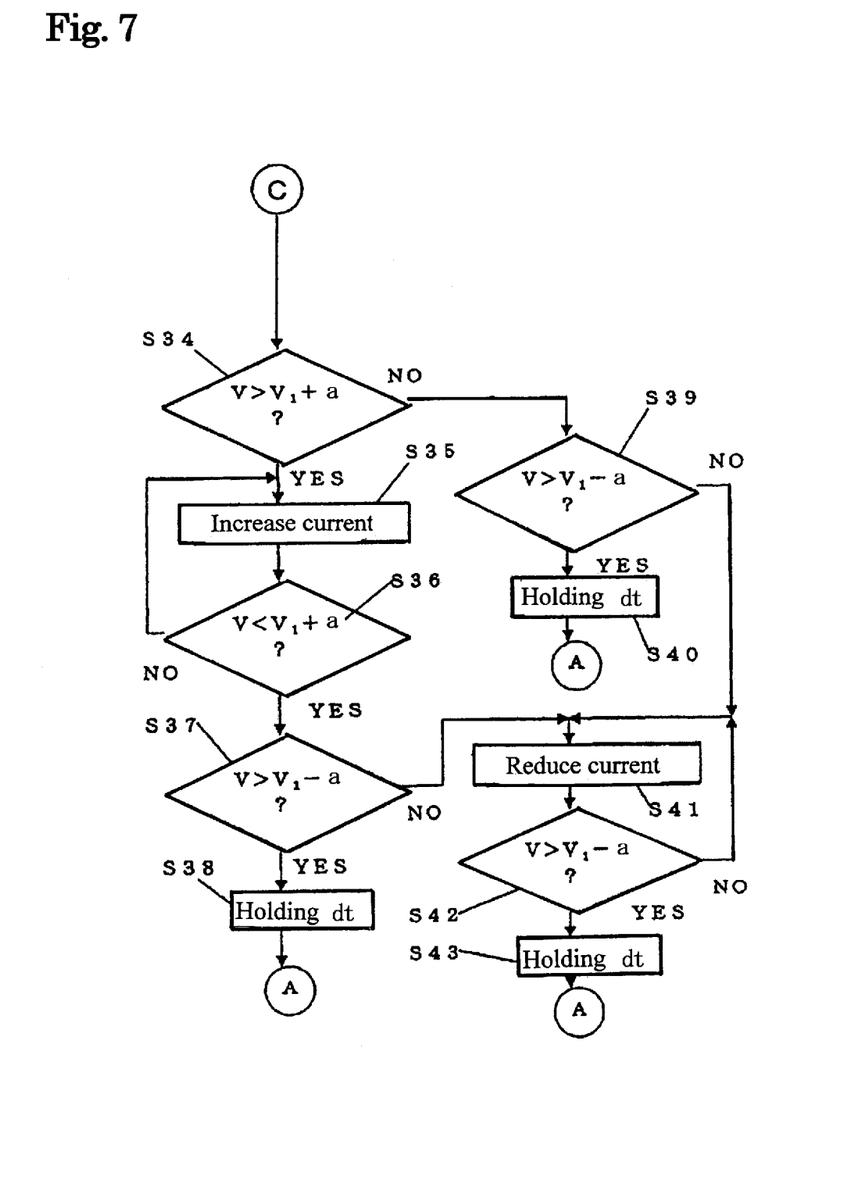
FIG. 7 is the flow chart of the controller shown in the drawing to be worked for the generator shown in FIG. 3.

Control action of generator circuit as shown in FIG. 5 is explained in the following flow chart as shown in FIGS. 6 and 7.

The controller 18 detects the driving function of generator or motor (step S10) after start of the systems, and if the system is used for the generator, the controller is carried out the order of the programming. The controller 18 detects the speed of generator and the generated voltage (step S22) after starter switch is operated and check the speed N of generator if it is lower than speed set in advance N1 which is decided before (step S23). When the speed N is lower than N1, the neutral switch 392 and 393 is switched OFF and the neutral switch 391 is switched ON (steps 333). If the speed N is larger than N1 (step S23), the controller forward next step S24 then the controller check the speed of the generator if the speed N is larger than N2(step S24). When the speed N is larger than N2 (step S24), the controller set the switch 393 ON condition, and the switch 391 and 392 OFF condition. (step S26) If the speed N is lower than N2 (step S24), the controller control the switch 391 and 392 OFF condition, and set the switch 392 ON position (step S25). After controlling (step S25, S26 and S333), the controller 18 check the load voltage by censer 16 if the voltage put the allowance of voltage which is (V1+/−) (+/−:+ or −) (step S34) and when the voltage V is larger than (V1+a) which is higher level of the voltage set in advance in the allowance, the current of solenoid coil 142 of control side is increased (step S35). If the voltage V is smaller than (V1+ a), controller makes the control forward to step S39. After the controlling step S35, the controller checked the voltage if the voltage V is smaller than (V1+a) (step S36). If no, the controller move the control to the step S35 and if yes, controller forward next step S37. When the voltage V is larger than (V1−a) which is lower level of the voltage in set advance in the allowance, (step S37) the controller 18 leave the control condition intact in dt millisecond (step S38) then the controller make the control return to the start point in front of the step S10 (point "A" in FIG. 6). If the voltage V is smaller than (V1−a), the controller forward the step to S41. After the step 34 and the voltage V is smaller than (V1+a), controller forward to (step S39). If the voltage V is larger than (V1−a) in (step S39), the controller 18 leave the control condition intact in dt millisecond (step S40) then the controller makes the control return to the start point in front of the step S10 (point "A" in FIG. 6). If the voltage V is smaller than (V1−a), the control forward to (step S41). If the voltage V is smaller than (V1−a) in the (step S37), the controller forward the control chart to (step S41) to reduce a current amount flowing into the solenoid coil 142 of control side by the switch 13 (step S41). After reducing a current amount, controller check the voltage (step S42) and if the voltage V is larger than (V1−a), the controller 18 leave the control condition is kept dt millisecond intact (step S43). If the voltage V is smaller than (V1−a) in the (step S42), the controller makes the control return to (step S41).

When the generator system is used for motor, the controller control the system by the circuit shown in FIG. 6. In the case of using the generator for motor by detecting the signal of using order (step S10), the controller control the switch 56 and 391 in ON position (step S11) and check the speed of the motor (step S12). The controller check if the speed N is larger than N1 set in advance (step S13) and if yes, the control forward (step S33) and then if the speed N is smaller than N2, the control forward (step S331). The controller switch ON in the switch 392 and switch OFF in the switch 391 and 393 in (step S331). After the operation of (step S331), the controller forward to B position. The speed N is smaller than N1 in (step S13), the controller forward to (step S14) and the load levels L is measured in the sensor of 28 in the (step S14) and the controller detect the load L1 set in advance in (step S15) and load L is larger than (L1+b) (step S16) which is upper allowance of permissible range (L1+/−b), the controller is reduced the duty ratio of switching ON in (step S17). After currying out of operation (step S17), the controller check the load L and the load L is smaller than (L1+b) (step S18) and then if yes, controller forward to (step S19) and if the load L is larger than (L1−b) then after the control condition is kept dt millisecond intact, the controller forward the control to A position. If the load L is smaller than (L1+b) in (step S16) the control forward to (step S19) and if the load L is larger than (L1−b) in (step S18), the control forward to (step S17) and if load L is smaller than (L1−b), the control forward to (step S21) and then the control forward to (step S19) after control of increasing duty ratio of switching ON.

The invention claimed is:

1. A controller of a permanent magnet generator, comprising:
    a rotor shaft rotatably supported by a housing;
    a rotor fixed to the rotor shaft, and mounted with a plurality of permanent magnet members on an outer periphery side; and
    a stator disposed at the outside of the rotor and wound with a winding coil in three phase AC generator by star connection;
    wherein the winding coil of the stator for power coil and a solenoid coil of the power coil side and a solenoid coil of control side which are disposed at a position not interlinked with a magnet flux of a rotor, are connected in series and a power terminal is provided at least between the solenoid coil of power coil side and the solenoid coil of control side, and then the end of the solenoid coil of control side connected with a three phase rectifier constituted for neutral point and a switch connected with the DC terminal of the rectifier for letting flow a part of a current amount generated in the power coil to the solenoid coil of the control side for controlling current amount flowing into the solenoid coil of the control side by controlling ON/OFF of the switch by duty controlling so that a generated voltage is controlled to a voltage set in advance in response to a detection signal from a sensor for detecting the generated voltage by the power coil.

2. The controller of permanent magnet generator according to claim 1, wherein the three phase rectifier is full bridge power converter constituted by diodes and plurality terminals of the solenoid coils of control side are connected with the each wire of U, V, W phase between two diodes in the rectifier.

3. The controller of the permanent magnet generator according to claim 1 wherein the controller regulates a current amount flowing into the solenoid coil of control side by duty-controlling for controlling the current amount flowing into the solenoid coil of control side by controlling ON/OFF of the switch so that a generated voltage is controlled to a voltage set in advance in response to a detection signal from a sensor for detecting the generated voltage by the power coil, furthermore when the generated voltage sensed by the sensor of detecting the generated voltage is higher than the voltage set in advance, the current amount is increased by the controller and when the generated voltage is lower than the voltage set in advance, the current amount is reduced by the controller.

4. The controller of the permanent magnet generator according to claim 1, wherein the plurality of terminals for neutral point of three phase generator are provided on the beginning and halfway of the power coils so that the neutral point can be changed and plurality neutral switches are provided to control ON/OFF of the neutral switches for the generated current amount flowing into the neutral point, moreover, the controller control ON/OFF of the neutral switch in response to detection signal from the sensor for detecting a rotor speed set in advance.

5. The controller of the permanent magnet generator according to claim 4, wherein the three phase rectifier is provided for the neutral switches to change neutral point, and terminals disposed on the beginning and halfway of power coils are connected with the wires between diodes of U, V, W each phase in the rectifier for neutral point and the neutral switch connected with DC terminal of the rectifier for switching ON/OFF of neutral switch and then the controller control ON/OFF of the neutral switch in response to detection signal from the sensor for detecting a rotor speed set in advance.

6. The controller of the permanent magnet generator according to claim 5, wherein the three phase rectifier is full bridge power converter constituted by diodes and terminals disposed on the beginning and halfway of power coils are connected with the wires between diodes of U, V, W each phase in the rectifier for the neutral point.

7. The controller of the permanent magnet generator according to claim 4, wherein the winding number of power coils are constituted by plurality of winding number T1, T2, - - - ,Tn and the winding number of power coils have the relation of following inequality T1<T1+T2<T1+T2+ - - - +Tn and the terminals of neutral point are disposed on the beginning and halfway of the power coils, and then the terminals connected with the wires between diodes of U, V, W each phase in the full bridge power converter and the neutral switches which are No. 1,No.2, - - - ,No.n are connected with DC terminals of the rectifiers and the controller control ON/OFF of the neutral switches in order to change the neutral point in response to detection signal from the sensor for detecting a rotor speed set in advance.

8. The controller of the permanent magnet generator according to claim 4, the controller performs a control in response to a detection signal from a sensor for detecting the rotor speed such that, when a rotational speed of the rotor is higher than the speed set in advance, the neutral switch of the power coil by the side of the small number of windings coil is turned ON, and at the same time the neutral switch of the power coil by the side of the large number of windings coil is turned OFF, in order to prevent the higher generated voltage at higher rotor speed.

9. The controller of the permanent magnet generator according to claim 4, wherein plurality power supply terminals connected with the power lines between the solenoid coil of power coil side and the power coil are connected with and plurality power supply switches for the electric motor drive connected with the plurality power supply terminals and another end of the power supply switches are connected with the storage battery of power side trough the controller, furthermore, the controller supply a current amount to the power coils from the storage battery so that the generator is driven for an electric motor by the current amount synchronized phase timing and controlled ON/OFF of the power supply switches.

10. The controller of the permanent magnet generator according to claim 9, wherein the controller performs a control the current amount in response to a detection signal from a sensor for detecting the order of load in the electric motor by controlling ON/OFF of the neutral switch, namely the controller regulates a current amount flowing into the power coil from the storage battery in response to required driving force power in the motor.

11. The controller of the permanent magnet generator according to claim 9, wherein the controller performs a control in response to a detection signal from a sensor for detecting the rotor speed such that, when a rotational speed of the rotor is higher than the speed set in advance, the neutral switch of the power coil by the side of the small number of windings coil is turned ON, and at the same time the neutral switches of the power coil by the side of the large number of windings coil is turned OFF in order to prevent the higher generated voltage at higher rotor speed, and when a rotational speed of the rotor is smaller than the speed set in advance, the neutral switch of the power coil by the side of the large number of windings coil is turned ON, and at the same time the neutral switches of the power coil by the side of the small number of windings coil is turned OFF, and then the controller performs to control current amount flowing into the power coils from the storage battery by controlling ON/OFF of the neutral switch in response to required driving house power, namely the controller make the neutral switch has both functions which are changing neutral point and regulating a current amount.

12. The controller of the permanent magnet generator according to claim 4, wherein the controller performs control of all of the neutral switches to turn OFF, when the controller detect an abnormal phenomenon in the power coil or an abnormal high speed on the rotor revolution speed in response to a detection signal from the sensors of a current leakage of the power coils and the rotor revolution speed.

* * * * *